US011122867B1

(12) United States Patent
Ajaj et al.

(10) Patent No.: US 11,122,867 B1
(45) Date of Patent: Sep. 21, 2021

(54) PUSH BUTTON SLIDE MECHANISM AND METHOD OF ASSEMBLING THE SAME

(71) Applicants: Omar Ajaj, North Kingstown, RI (US); Rachel Ajaj, North Kingstown, RI (US)

(72) Inventors: Omar Ajaj, North Kingstown, RI (US); Rachel Ajaj, North Kingstown, RI (US)

(73) Assignee: Productive Collaboration, LLC, Cranston, RI (US)

( * ) Notice: Subject to any disclaimer, the term of this patent is extended or adjusted under 35 U.S.C. 154(b) by 0 days.

(21) Appl. No.: 16/824,135

(22) Filed: Mar. 19, 2020

Related U.S. Application Data

(60) Provisional application No. 62/897,347, filed on Sep. 8, 2019.

(51) Int. Cl.
| | | |
|---|---|---|
| *F16G 11/00* | (2006.01) | |
| *A44B 17/00* | (2006.01) | |
| *F16G 11/10* | (2006.01) | |
| *A43C 7/00* | (2006.01) | |

(52) U.S. Cl.
CPC ........ *A44B 17/0011* (2013.01); *F16G 11/101* (2013.01); *A43C 7/00* (2013.01); *Y10T 24/3713* (2015.01); *Y10T 24/3984* (2015.01)

(58) Field of Classification Search
CPC ............. A44B 17/0011; Y10T 24/3984; Y10T 24/3713; Y10T 24/3969; Y10T 24/3973; Y10T 24/3724; F16G 11/101
See application file for complete search history.

(56) References Cited

U.S. PATENT DOCUMENTS

| | | | | |
|---|---|---|---|---|
| 1,379,093 | A | * | 5/1921 | Freeberg ................. F21V 21/16 24/115 G |
| 3,675,277 | A | * | 7/1972 | Day ..................... A41D 25/022 24/66.9 |
| 5,008,981 | A | | 4/1991 | Smithson |
| 5,365,641 | A | | 11/1994 | Watanabe et al. |

(Continued)

FOREIGN PATENT DOCUMENTS

| | | |
|---|---|---|
| KR | 100758543 | 9/2007 |
| KR | 200472726 | 4/2014 |

OTHER PUBLICATIONS

Etsy, set of 3-Round (15mm Hole: 3.5 mm for round Cords) Plastic Silver Color Push Button Slider Clasps, Jewelry cords slider clasps Beads Findings, ERdesignsjewelry.

(Continued)

*Primary Examiner* — Robert Sandy
*Assistant Examiner* — Michael S Lee
(74) *Attorney, Agent, or Firm* — Salter & Michaelson

(57) ABSTRACT

A push button slide mechanism, includes an outer member having a bottom wall and an upstanding side wall. The outer member defines at least one pair of holes through the upstanding side wall. The mechanism includes an inner member having a top plate and a bottom plate defining a single annular channel therebetween. The single annular channel receives an elongated member in all rotational positions of the inner member relative to the outer member. A spring member spring-biases the outer member relative to the inner member. Pressing the inner member toward the outer member against the spring forces of the spring causes the single annular channel to align with the holes through the upstanding side wall of the outer member.

11 Claims, 15 Drawing Sheets

(56) References Cited

U.S. PATENT DOCUMENTS

| | | | |
|---|---|---|---|
| 5,713,830 A * | 2/1998 | Tucker | A61F 5/41 |
| | | | 128/883 |
| 6,206,332 B1 | 3/2001 | Middendorp et al. | |
| 2020/0219471 A1* | 7/2020 | Jancic | A45F 5/00 |

OTHER PUBLICATIONS

Rio Grande, "Sterling Silver Rhodium-Plated Flat Adjustable Cord Slide Clasp;" item #: 613546, https://www.riogrande.com/product/sterling-silver-rhodium-plasted-flat-adjustable-cord-slide-clasp/613546.

* cited by examiner

PUSH BUTTON SLIDE MECHANISM AND METHOD OF ASSEMBLING THE SAME

CROSS-REFERENCE TO RELATED APPLICATIONS

This application claims the benefit of U.S. Provisional Patent Application Ser. No. 62/897,347, filed on Sep. 8, 2019, entitled "PUSH BUTTON SLIDE MECHANISM" the content of which is incorporated by reference herein in its entirety.

FIELD OF THE DISCLOSURE

The present disclosure relates generally to jewelry and accessories therefor. In particular, the present invention is directed to a slide mechanism for adjusting jewelry, namely, controlling the length of a jewelry chain, cord or other elongated jewelry member.

BACKGROUND OF THE DISCLOSURE

There have been many attempts in the prior art to provide a mechanism for adjusting the length of a jewelry chain, cord, or other elongated member. For example, as shown in FIGS. 1-4, a slide "bead" is employed for the purpose of adjusting the length of a jewelry chain, cord, or other elongated member 110. As seen in FIG. 1, a cord 110 passes through both an outer member 130 and an inner member 120. The inner member 120 and the outer member 130 each include sidewalls 122 and 132, respectively, that include four transverse holes 120a, 120b, 120c, 120c, and 130a, 130b, 130c, 130d, respectively. The holes 120a, 120b, 120c, 120c, 130a, 130b, 130c, and 130d can be any thickness, such as 1 millimeter (mm). As can be seen in FIGS. 2 and 3, the inner member 120 and the outer member 130 are spring-biased related to one another by a coil spring 300 that is centered by a spring centering post 420 on the inner surface of the inner member 120 and a spring centering post 430 on the outer member 130. FIG. 4 shows all of the parts of the prior art push button slide mechanism.

As is well known in the prior art, when the inner member is pressed into the outer member, against the forces of the coil spring, the inner holes through the side wall of the inner member are aligned with the outer holes through the wall of the outer member. Only upon alignment of the all four holes, a cord (or chain or other) may pass through both the inner member and the outer member. After the cord is passed fully through all of the aligned holes (e.g., holes 120a, 120b, 120c, 120c, 130a, 130b, 130c, 130d), the inner member may be released whereby the outward spring-biasing of the coil spring causes a misalignment of the holes so that the inner member and the outer member grips the cord to thereby prevent sliding of the mechanism along the cord. Thus, the jewelry item (the decorative portion thereof) not being shown for illustrative purposes only.

There are many disadvantages of the push button slide mechanism of the prior art. Most importantly is that both the inner member and the outer member have holes that must be aligned with each other. More specifically, the four holes 120a-120d in the sidewall 122 of the inner member 120 must be precisely aligned with the holes 130a-130d in the sidewall 132 of the outer member 130. For example, FIG. 2 shows such a required alignment. Moreover, the inner member must still be pushed down precisely to maintain the alignment so that the transverse pass through can be formed by the holes in the side walls 122 and 132 so that the cord can be smoothly and easily passed therethrough. With such a small part, it can be quite difficult to maintain alignment of the holes throughout the cord threading process.

In view of the foregoing, there is a need for a push button slide mechanism that is easy to assemble. There is a need for a push button slide mechanism that does not require the inner member to be precisely rotationally aligned relative to the outer member in order for the jewelry cord, chain or other elongated member to be routed therethrough with ease. There is yet a further need for a push button slide mechanism that is easy to manufacture.

SUMMARY OF THE DISCLOSURE

A push button slide mechanism includes an outer member having a bottom wall and an upstanding side wall, and an inner member. The outer member defines at least one pair of holes through the upstanding side wall. The inner member has a top plate and a bottom plate defining a single annular channel therebetween. The single annular channel receives an elongated member in all rotational positions of the inner member relative to the outer member. The mechanism includes a spring member, the spring member spring-biasing the outer member relative to the inner member. In the mechanism, pressing the inner member toward the outer member against the spring forces of the spring causes the single annular channel to align with the holes through the upstanding side wall of the outer member thereby permitting the elongated member to pass through the at least one pair of the holes in the outer member and through the single annular channel of the inner member. In the mechanism, release of the inner member relative to the outer member provides a spring clamping force of the push button slide mechanism to the elongated member.

The at least one pair of holes are two pair of holes through the upstanding side wall of the outer member. In the push button slide mechanism, both the top plate and the bottom plate are circular in shape. In the push button slide mechanism, both the top plate and the bottom plate have substantially the same diameter. The push button slide mechanism of claim 4 wherein the upstanding side wall of the outer member define a circular opening that is dimensioned to receive therein both the top plate and the bottom plate of the inner member. The circular opening defined by the upstanding side wall of the outer member is dimensioned to be slightly greater than the diameter of either of the top plate and the bottom plate so that the top and bottom plates are guided within the circular opening. A depth of the circular opening is greater than a total height of the inner member. The elongated member can be a chain or a cord. The elongated member can be configured to pass through a first hole on the outer member, in through the single annular channel, around the middle column of the inner member, and then out through a second hole on the outer member. The elongated member can have a first part configured to pass through a first hole on the outer member in through the single annular channel and out through a second hole on the outer member, and wherein a second part of the elongated member is configured to pass through a third hole on the outer member then in through the single annular channel and then out through a fourth hole on the outer member. The spring can be held in place by a centering post on the inner member and a corresponding spring centering post on the outer member, and wherein the spring centering post is within a cavity at a center of the single annular channel. The spring can be held in place by a spring centering post formed on the bottom plate of the inner member. The bottom plate and the top plate can be substantially parallel with respect to each other. The push button slide mechanism of claim 1, wherein the holes are circular, square, or oval.

A jewelry clasp includes an outer member having a bottom wall and an upstanding side wall, and an inner member. The outer member defines at least four holes through the upstanding side wall. The inner member has a top plate and a bottom plate defining a single annular channel therebetween. The single annular channel receives an elongated member. The mechanism includes a spring member. The spring member spring-biases the outer member relative to the inner member, wherein the spring is held in place by a centering post on the inner member and a corresponding spring centering post (or spring seat) on the outer member, and wherein the corresponding spring centering post within a cavity at a center of the single annular channel. The single annular channel is configured to receive the elongated member in all rotational positions of the inner member relative to the outer member. In the jewelry clasp, pressing the inner member toward the outer member against the spring forces of the spring causes the single annular channel to align with the holes through the upstanding side wall of the outer member thereby permitting the elongated member to pass through the at least one pair of the holes in the outer member and through the single annular channel of the inner member. In the jewelry clasp, releasing the inner member relative to the outer member provides a spring clamping force of the push button slide mechanism to the elongated member. In the jewelry clasp, the corresponding spring centering post is formed on a bottom plate of the inner member. In the jewelry clasp, the elongated member has a first part configured to pass through a first hole on the outer member in through the single annular channel and out through a second hole on the outer member, and wherein a second part of the elongated member is configured to pass through a third hole on the outer member then in through the single annular channel and then out through a fourth hole on the outer member.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
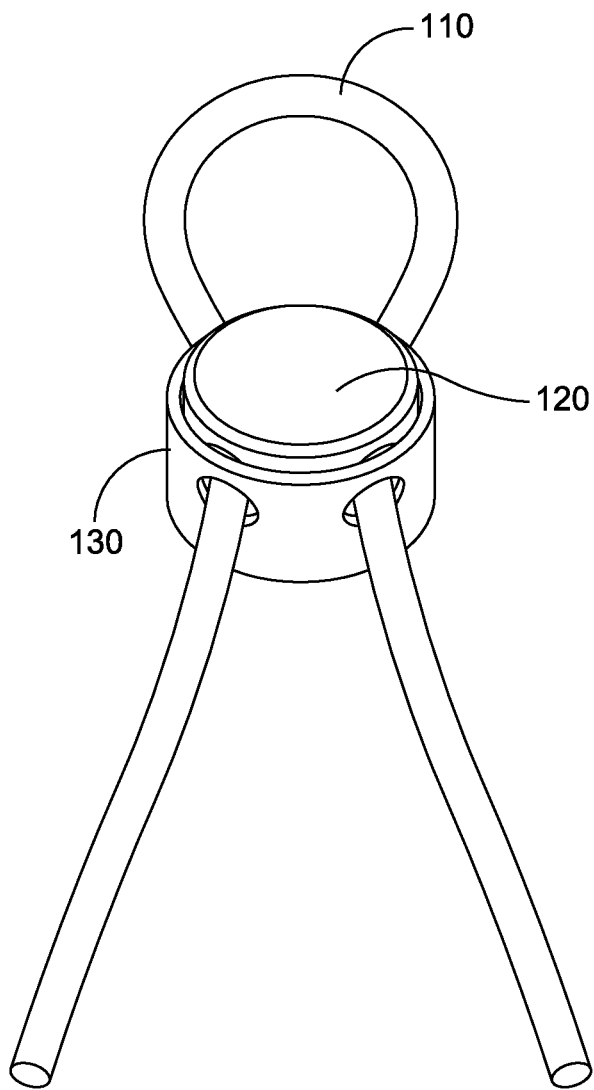
FIGS. 1-4 show a prior art push button slide mechanism.
Figure 2:
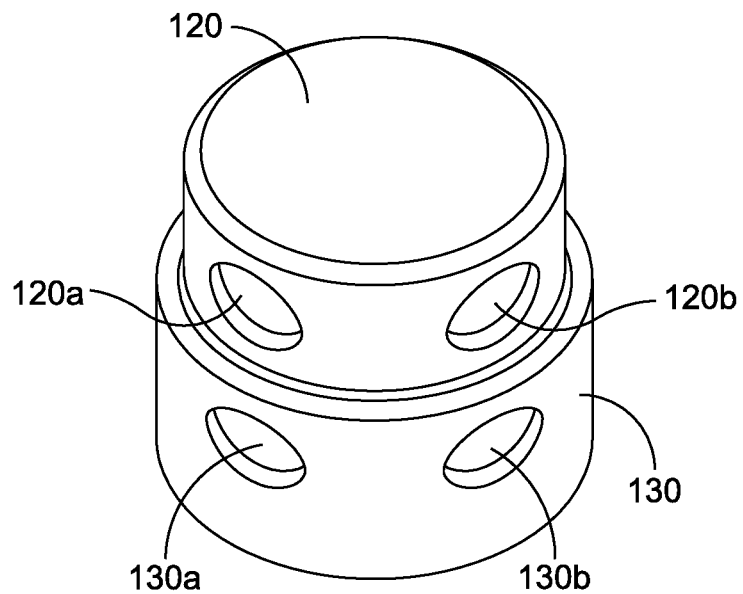
Figure 3:
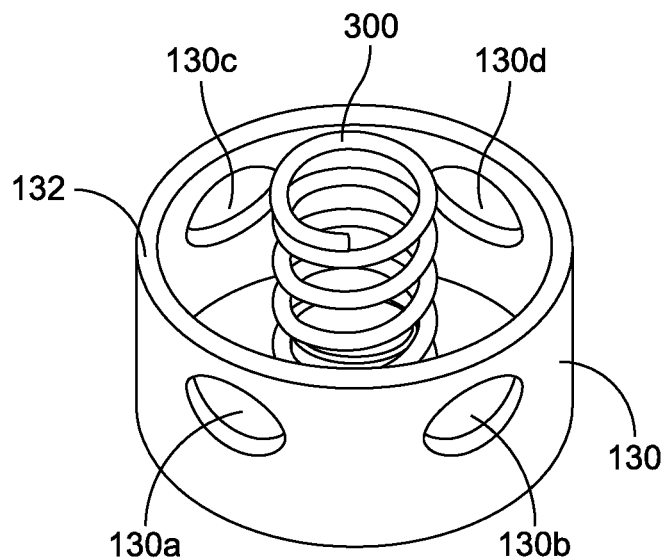
Figure 4:
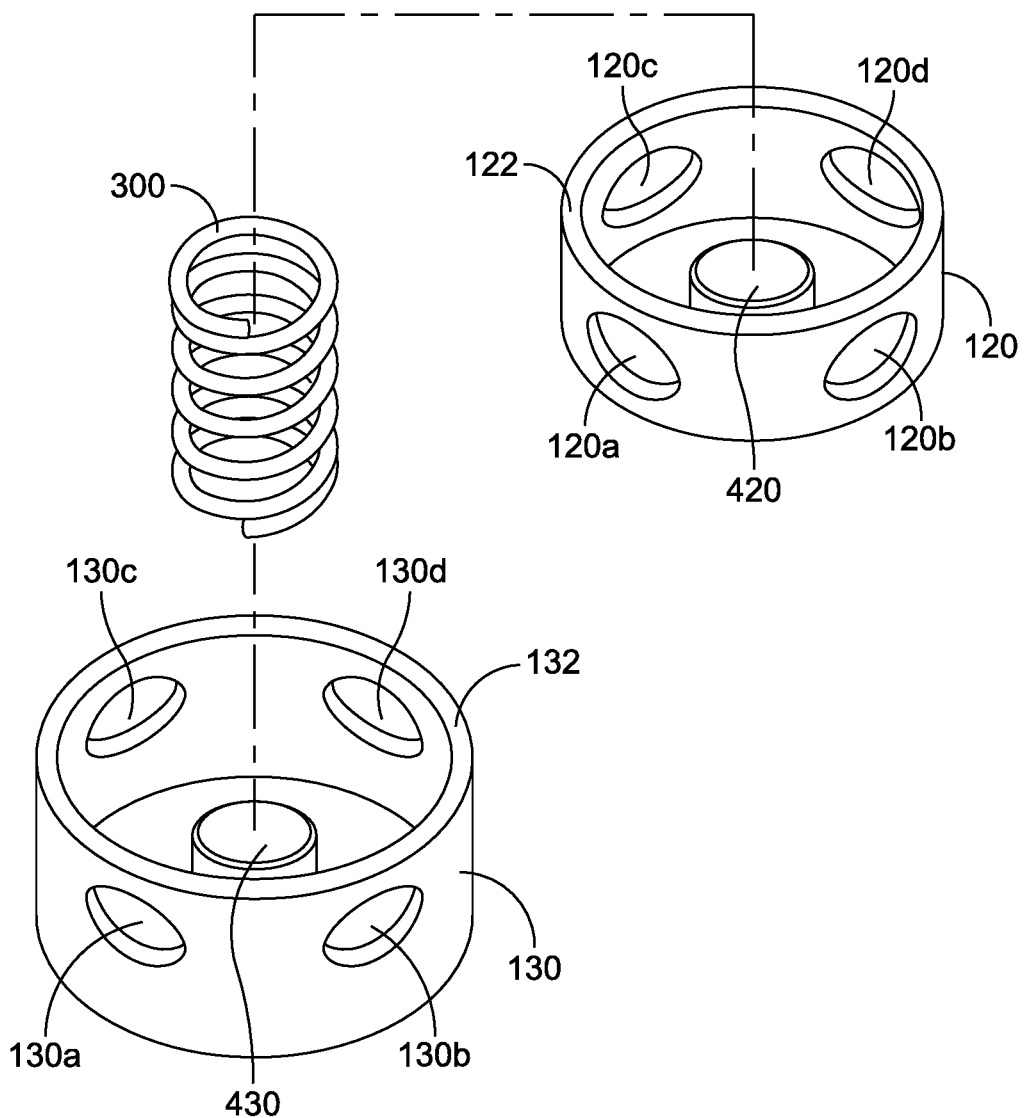
Figure 5:
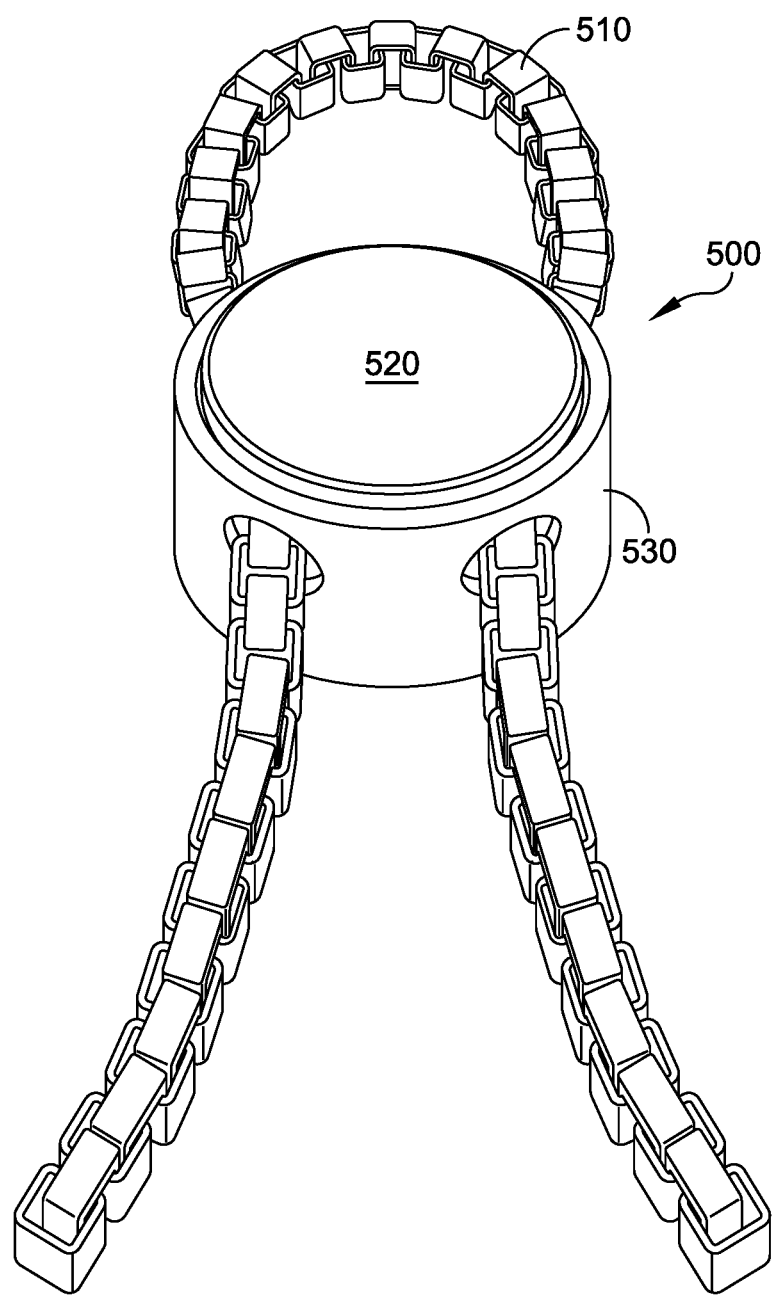
FIG. 5 is a perspective view of a push button slide mechanism engaged with an elongated member, according to the present disclosure.
Figure 6:
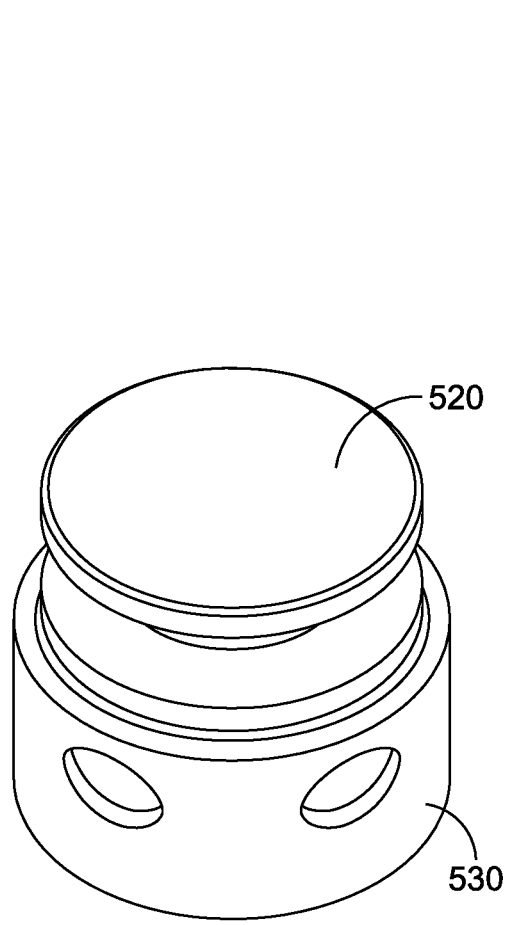
FIG. 6 is a perspective view of the inner member and the outer member of the push button slide mechanism, according to the present disclosure.
Figure 7:
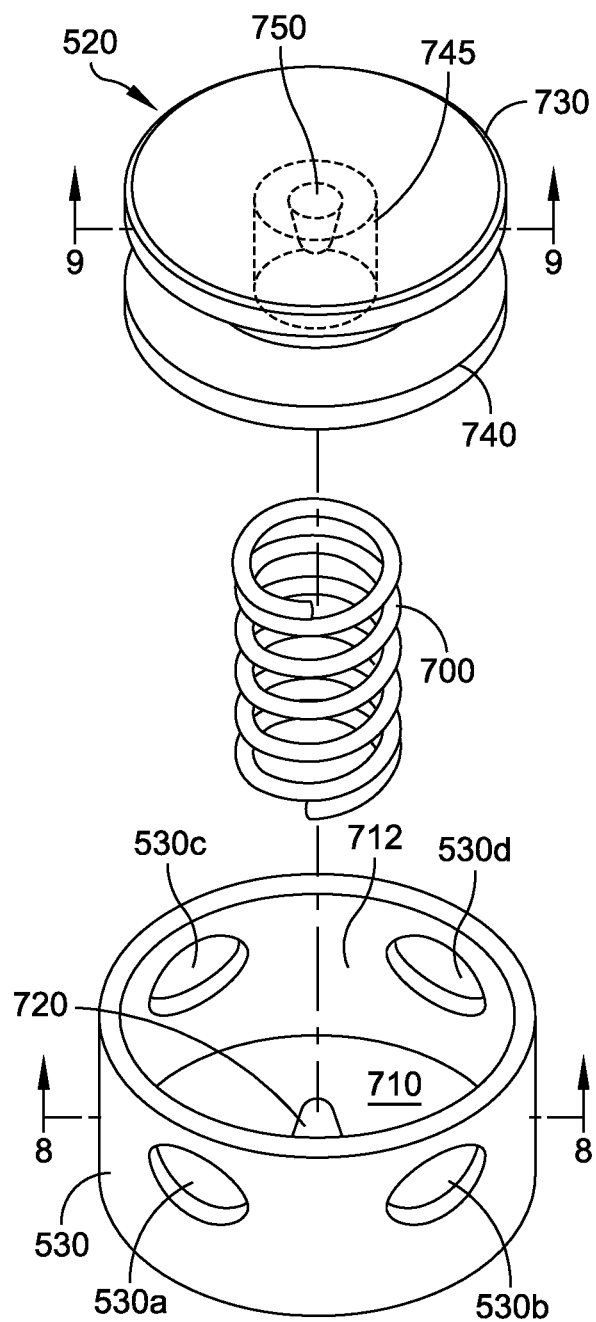
FIG. 7 is an exploded view of an inner member, a spring member, and an outer member of the push button slide mechanism, according to the present disclosure.

The present disclosure provides a new and unique push button slide mechanism for adjusting jewelry. Turning to FIGS. 5-7, the operation of the push button slide mechanism 500 of the present invention is shown.

FIG. 5 is a perspective view of a push button slide mechanism 500 engaged with an elongated member 510, according to the present disclosure. The push button slide mechanism 500 includes an inner member 520 that engages with an outer member 530 to position the elongated member 510 with respect to the push button slide mechanism 500. The inner member 520 and the outer member 530 are shown in greater detail in FIGS. 6 and 7.

FIG. 6 is a perspective view of the inner member 520 and the outer member 530 of the push button slide mechanism 500, according to the present disclosure. The inner member 520 is shown with no force applied on the inner member 520, such that the inner member 520 is protruding out from the outer member 530.

FIG. 7 is an exploded view of an inner member 520, a spring member 700, and an outer member 530 of the push button slide mechanism, according to the present disclosure. FIG. 7 shows details of the inner member 520 and the outer member 530 of the push button slide mechanism 500 of the present disclosure. The inner member 520 has a top plate 730 and a bottom plate 740 with a middle column 745 therebetween. Extending into the middle column 745 from the bottom plate 740 is a spring seat 750 with a spring-centering post therein.

Figure 12:
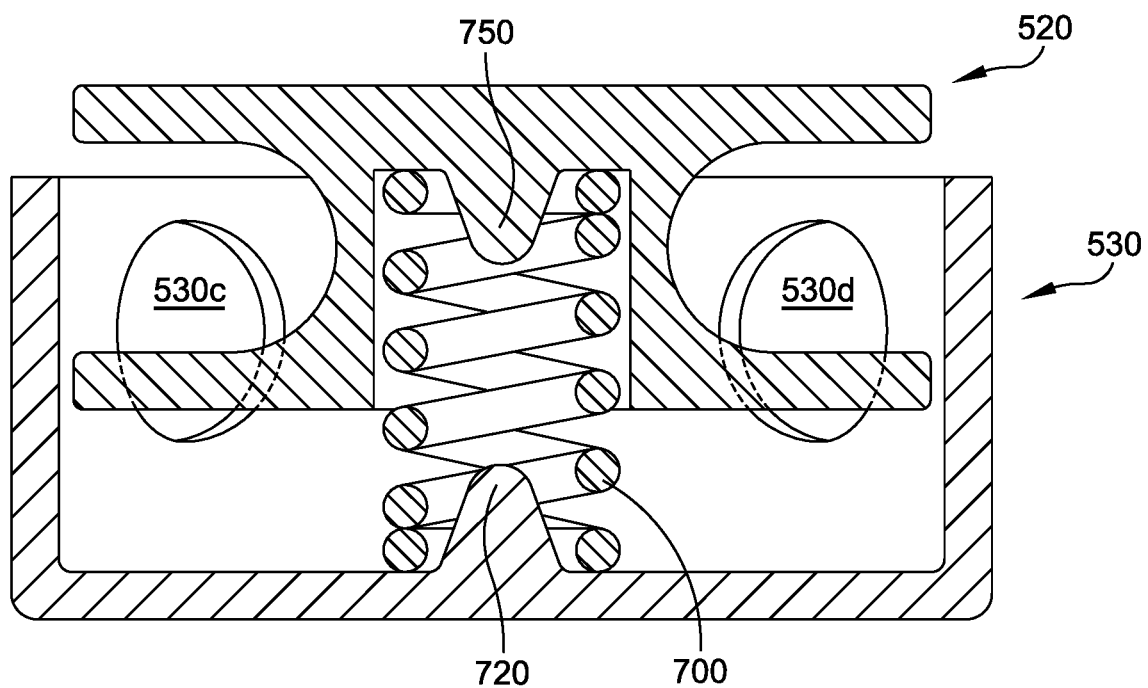
FIG. 12 is a cross-sectional view of the inner member, the spring member, and the outer member of FIG. 11, with the inner member received in the outer member such that the spring member is engaged with the spring seat on the inner member and the centering post in the floor of the outer member, according to the present disclosure.
Figure 15:
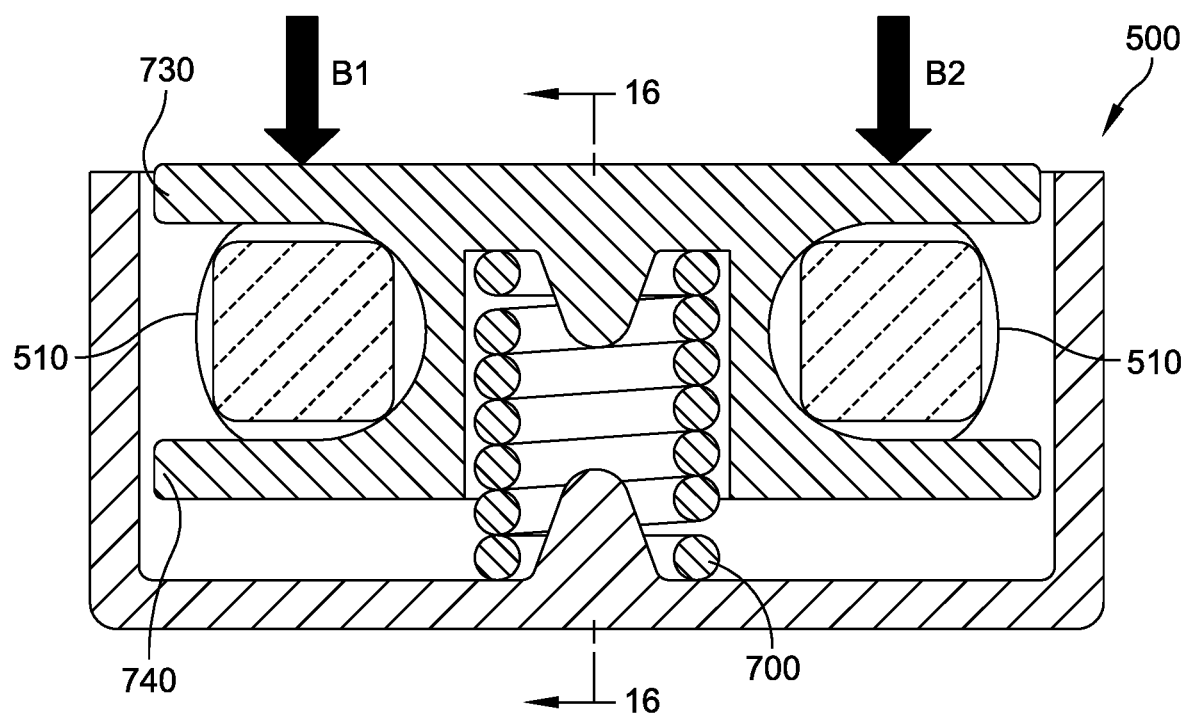
FIG. 15 is a cross-sectional view showing the inner member and the outer member, with a force applied on the spring to allow the elongated member to pass through the channel between the top and bottom plates of the inner member.

The outer member 530 includes a floor 710 with a circular upstanding wall 712 that includes four holes 530a-530d therethrough. The holes may be approximately 2.5 mm in diameter and spaced apart from each other by approximately 11.9 mm, however any size and spacing can be used. A spring-centering post 720 is located on the floor 710 of the outer member 530. The post 720 may be of any side and shape, such as 2.18 mm in height and 3.3 mm in width in the form of a pointed tooth-like shape. Pair of holes, namely 530a, 530c as well as 530b, 530d are configured to receive a cord, chain or other jewelry elongated member (e.g., elongated member 510 shown in FIG. 5) therethrough, as will be discussed in greater detail herein. The dimensions discussed herein are optimal to accommodate a chain/cord of 1.5 mm thickness but the configuration of the mechanism can be changed to suit the sizing and type of elongated member routed therethrough. The spring member 700 has one end located on the spring-centering post 750 on the inner member 520 and the other end of the coil spring is located on the spring-centering post 720 of the outer member 530 when assembled (see, for example, FIG. 12 or FIG. 15 showing inner member 520, spring 700, and outer member 530 engaged).

Figure 8:
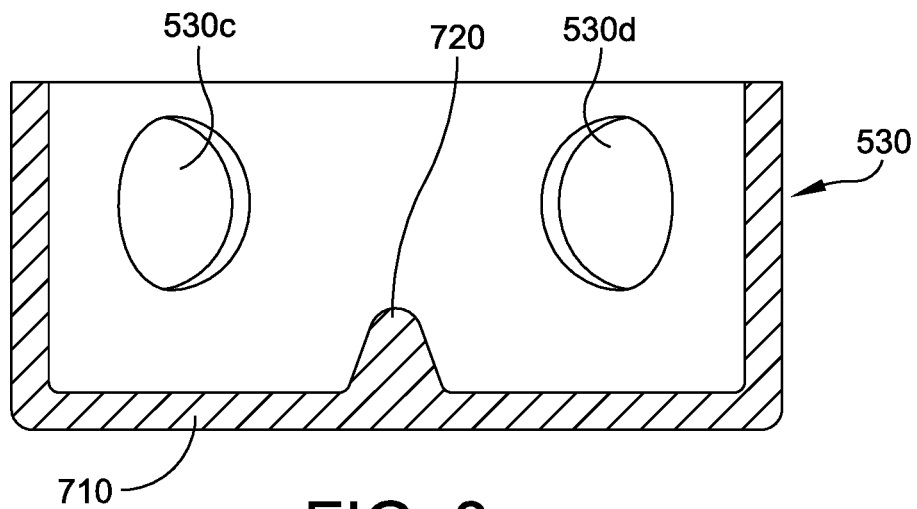
FIG. 8 is a cross-sectional view as taken along line 8-8 of FIG. 7.

FIG. 8 is a cross-sectional view as taken along line 8-8 of FIG. 7. The floor 710 and spring-centering post 720 of the outer member 530 are visible. The holes 530c, 530d on the sidewall of the outer member 530 are shown in this cross-sectional view.

Figure 9:
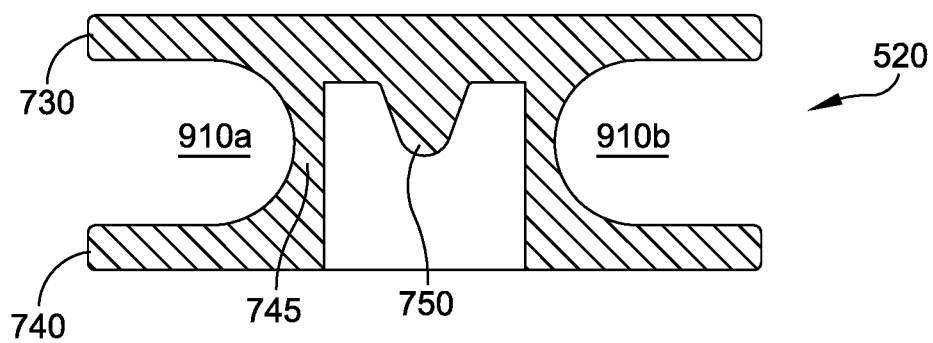
FIG. 9 is a cross-sectional view as taken along line 9-9 of FIG. 7.

FIG. 9 is a cross-sectional view as taken along line 9-9 of FIG. 7. As shown, the inner member 520 includes a top plate 730 and a bottom plate 740. A single annular channel 910a, 910b is formed between the top plate 730 and the bottom plate 740. The middle column 745 is between the top plate and the bottom plate 740 and has a spring seat 750 formed in a cavity within the middle column 745. The top plate 730 is generally parallel with respect to the bottom plate 740, and the middle column 745 is perpendicular with respect to the top plate 730 and the bottom plate 740.

In FIG. 9, it can be seen that the inner member (shown in detail in FIGS. 9-12) has a spring seat 750 with a spring-centering post therein, as best visible in FIG. 9. A pass through channel 910a, 910b is defined as a single annular channel, or a circumferential channel, defined between the top plate 730 and the bottom plate 740. The top plate 730 may, for example, be 10.7 millimeters (mm) in diameter and the bottom plate 740 may be 12.7 mm in diameter. However, the parts and components of the present disclosure may be dimensioned in any other way to accommodate the cord or chain to be received and the nature and type of jewelry with which it will be used. In some cases, the top and bottom plates may have the same diameter of approximately 10-13 mm.

Figure 10:
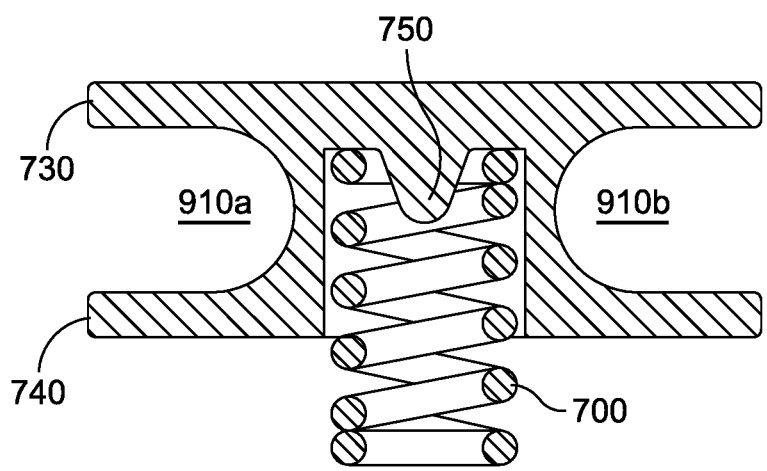
FIG. 10 is a cross-sectional view of the inner member of FIG. 9 showing the spring member engaged with the spring seat of the inner member.

FIG. 10 is a cross-sectional view of the inner member of FIG. 9 showing the spring member 700 engaged with the spring seat 750 of the inner member 530.

Figure 11:
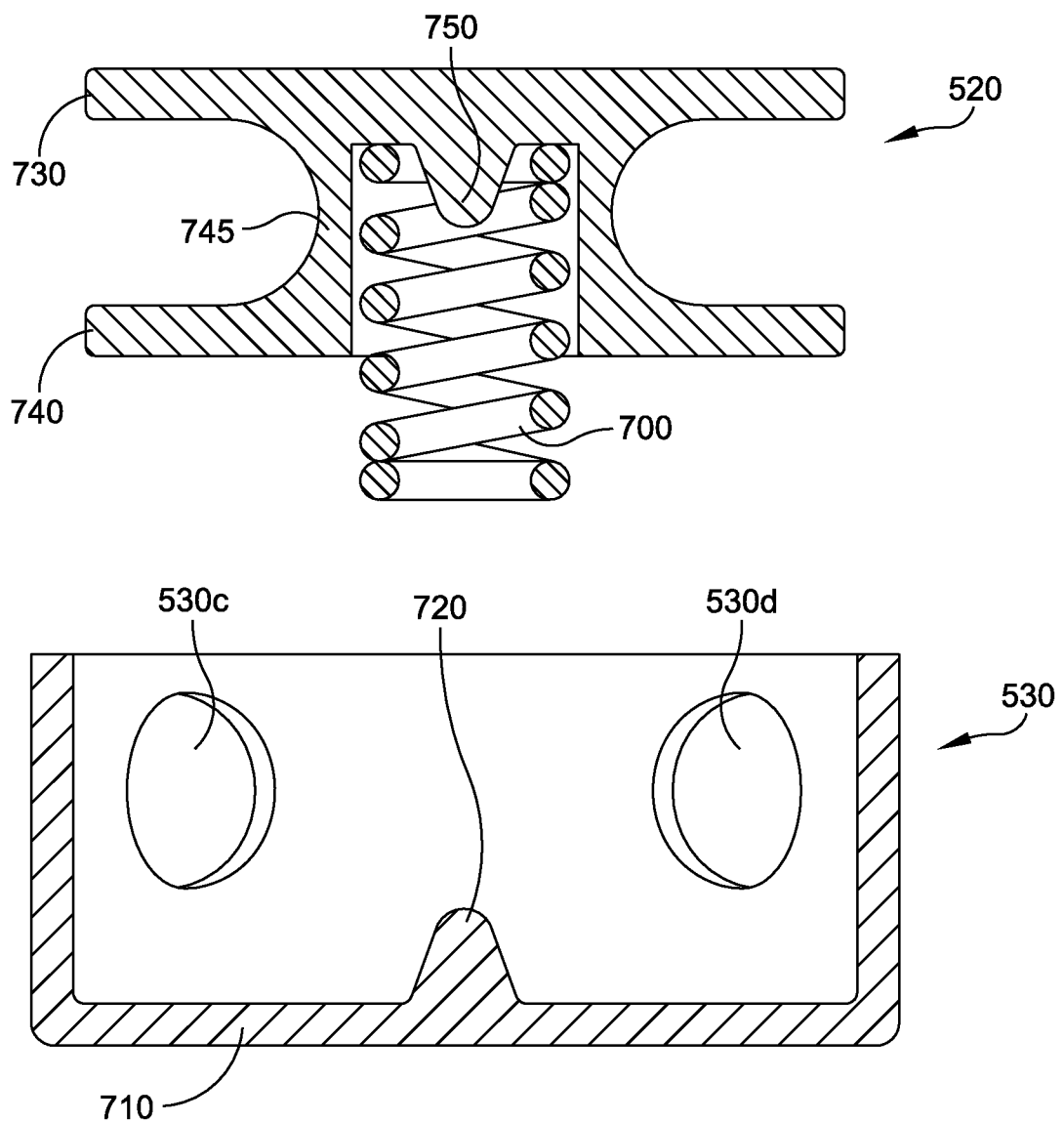
FIG. 11 is a cross-sectional view of the inner member and spring member of FIG. 10 as engaged with the outer member of FIG. 8, shown with the inner member and spring member separated from the outer member, according to the present disclosure.

FIG. 11 is a cross-sectional view of the inner member and spring member of FIG. 10 as engaged with the outer member of FIG. 8, shown with the inner member and spring member separated from the outer member, according to the present disclosure.

Referring to FIG. 12, one end of the coil spring is located on the spring-centering post 750 on the inner member 520 and the other end of the coil spring is located on the spring-centering post 720 of the outer member 530. The spring can be approximately 3.5 mm in length but it can be of any shape, size and compression to suit the application at hand. Thus, the inner member 530 and the outer member 530 are spring-biased relative to each other.

Figure 13:
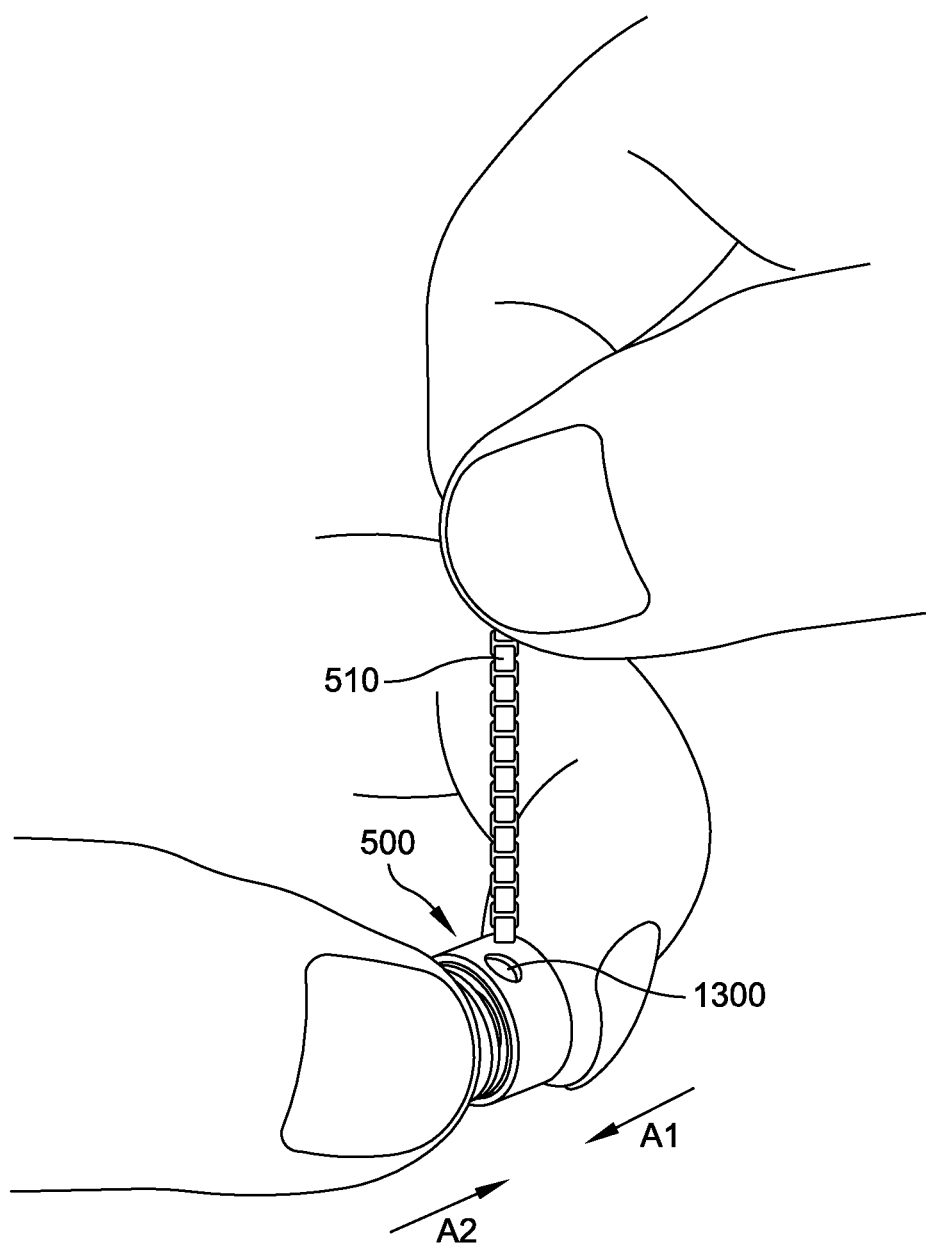
FIG. 13 is a perspective view of a person pressing the inner member toward the outer member, to permit the elongated member to pass through at least a hole in the outer member, according to the present disclosure.
Figure 14:
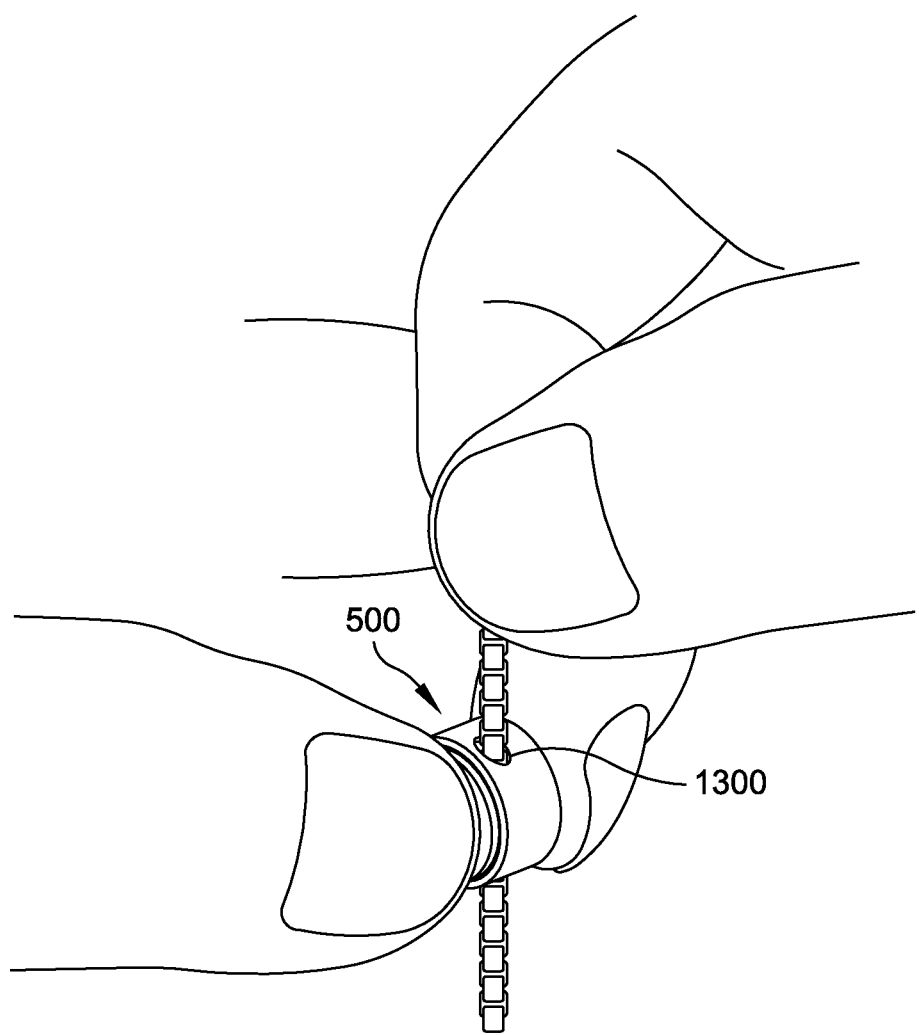
FIG. 14 is a perspective view of the elongated member through the first hole in the sidewall and out a second hole opposite the first hole, according to the present disclosure.

Referring to FIG. 13, a perspective view of a person pressing the inner member toward the outer member is shown, which permits the elongated member to pass through at least a hole in the outer member, according to the present disclosure. By pressing the inner member toward the outer member (in the direction of arrows A1, A2), the hole 1300 lines up with the single annular channel so that the elongated member 510 can pass completely through, as shown in FIG. 14. FIG. 14 is a perspective view of the elongated member through the first hole in the sidewall and out a second hole opposite the first hole, according to the present disclosure. FIG. 15 is a cross-sectional view of the push button slide mechanism 500 with a force applied to the inner member (arrows B1, B2) to bias the inner member 520 toward the outer member 530. The force applied to the spring 700 (via arrows B1, B2) allows the elongated member 510 to pass through the channel between the top plate 730 and the bottom plate 740. In comparison to FIG. 12, where there is no pressure applied to the inner member, this secures the elongated member within the push button slide mechanism due to force of inner member applied to the elongated member 510. As shown in FIG. 12, the inner member and the outer member are at rest without any compression of the spring.

Figure 16:
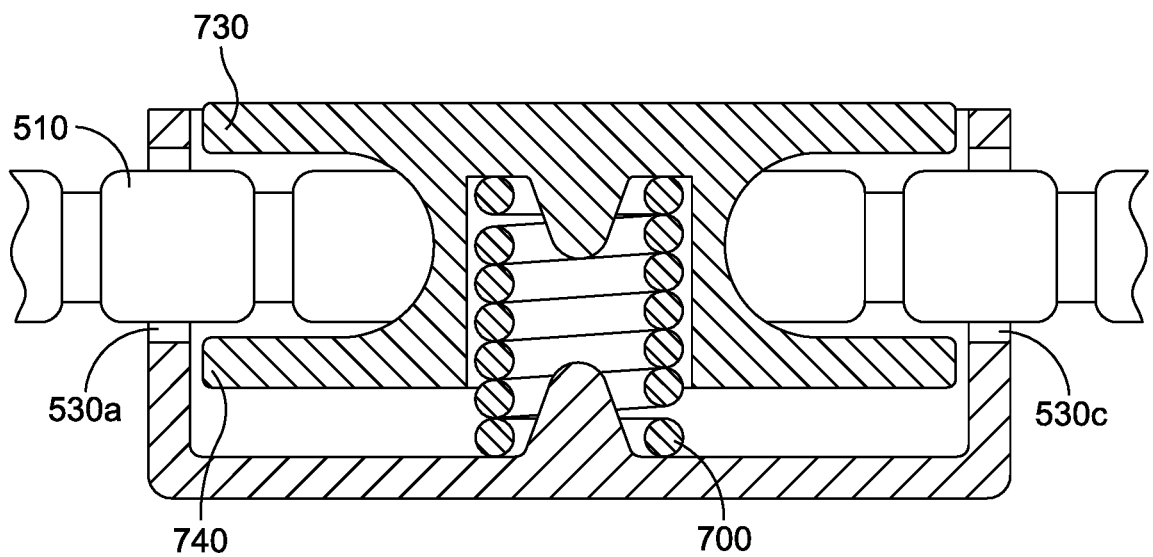
FIG. 16 is a cross-sectional view as taken along line 16-16 of FIG. 15.

In FIG. 15, the inner member and the outer member are pressed toward each other (arrow B2) against the force of the spring. This allows for holes 530a, 530c to align with the circumferential channel 910a, 910b, and for holes 530b, 530d to align with the circumferential channel as shown in FIG. 16. Unlike the prior art, the rotational positioning of the inner member relative to the outer member does not matter because the circumferential channel is completely open about the periphery of the inner member. The single annular channel is configured to receive the elongated member in all rotational positions of the inner member relative to the outer member. As in FIGS. 15 and 16, when the holes are aligned with the channel, regardless of the rotational position of the inner member, a cord or other elongated member can be easily routed therethrough for installation onto a jewelry member to provide the desired cord locking. Therefore, once the cord is installed, a simple slight squeezing motion of the inner member relative to the outer member (as shown in FIG. 16 for example) causes the holes to align sufficiently to permit easy adjustment or re-adjustment of the jewelry cord.

Figure 17:
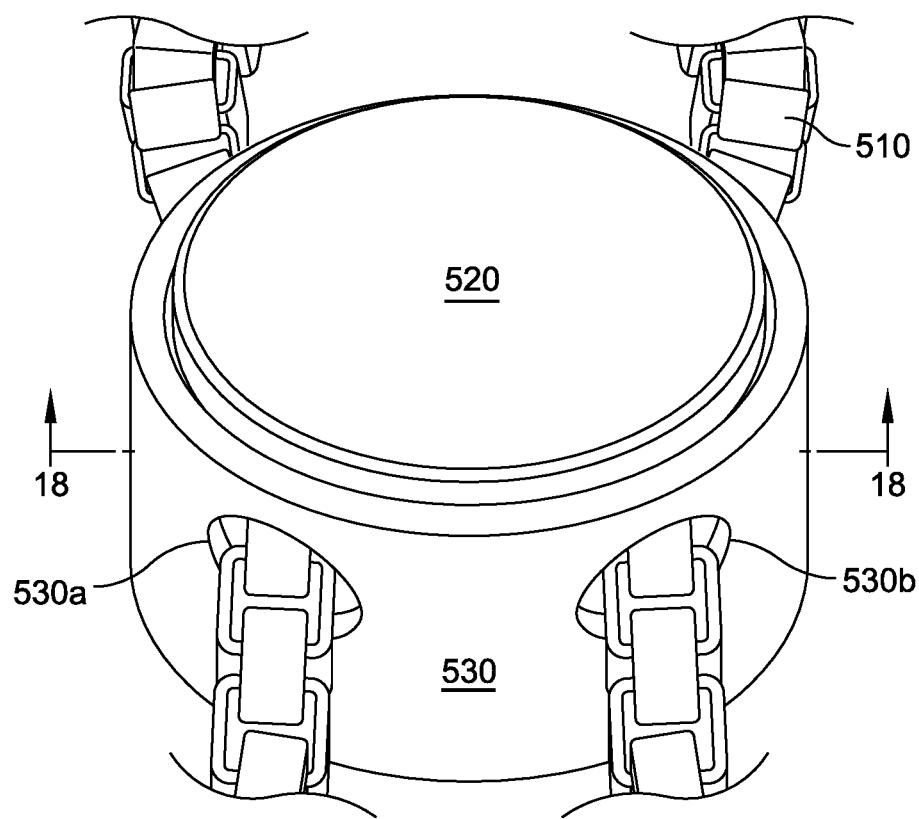
FIG. 17 is a perspective top view of the inner member engaged with the outer member, according to the present disclosure.

FIG. 17 is a perspective top view of the inner member engaged with the outer member, according to the present disclosure.

Figure 18:
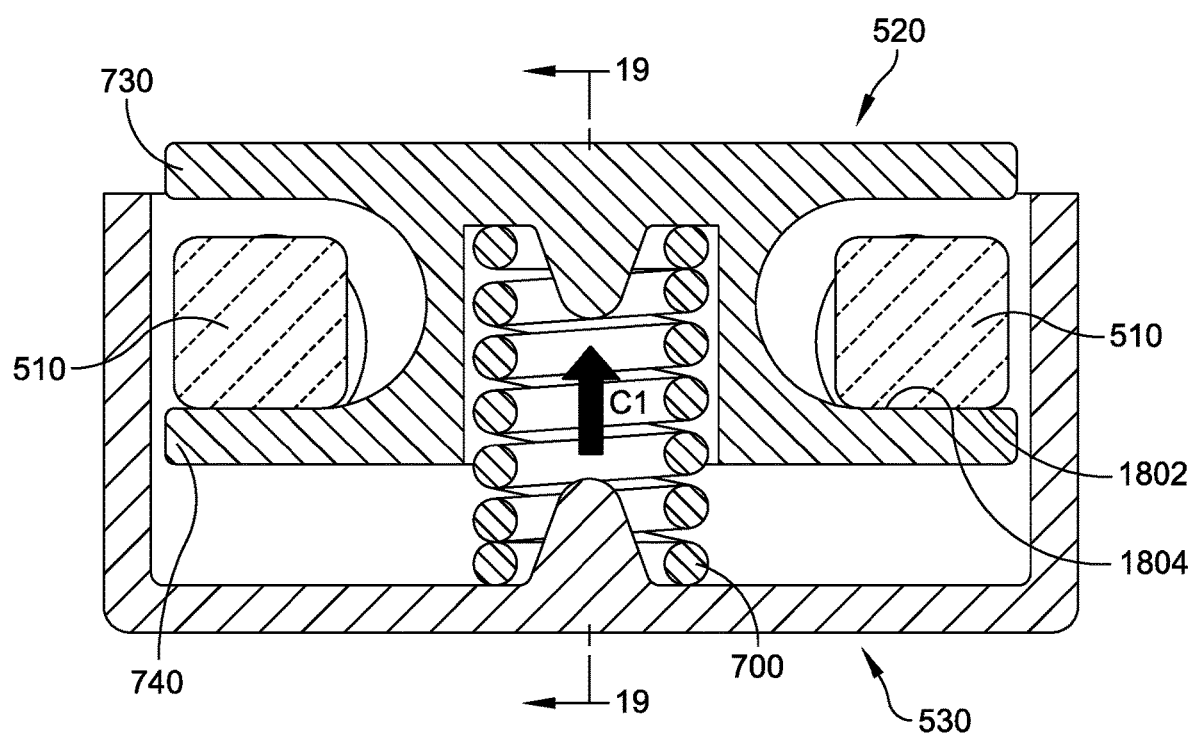
FIG. 18 is a cross-sectional view as taken along line 18-18 of FIG. 17.
Figure 19:
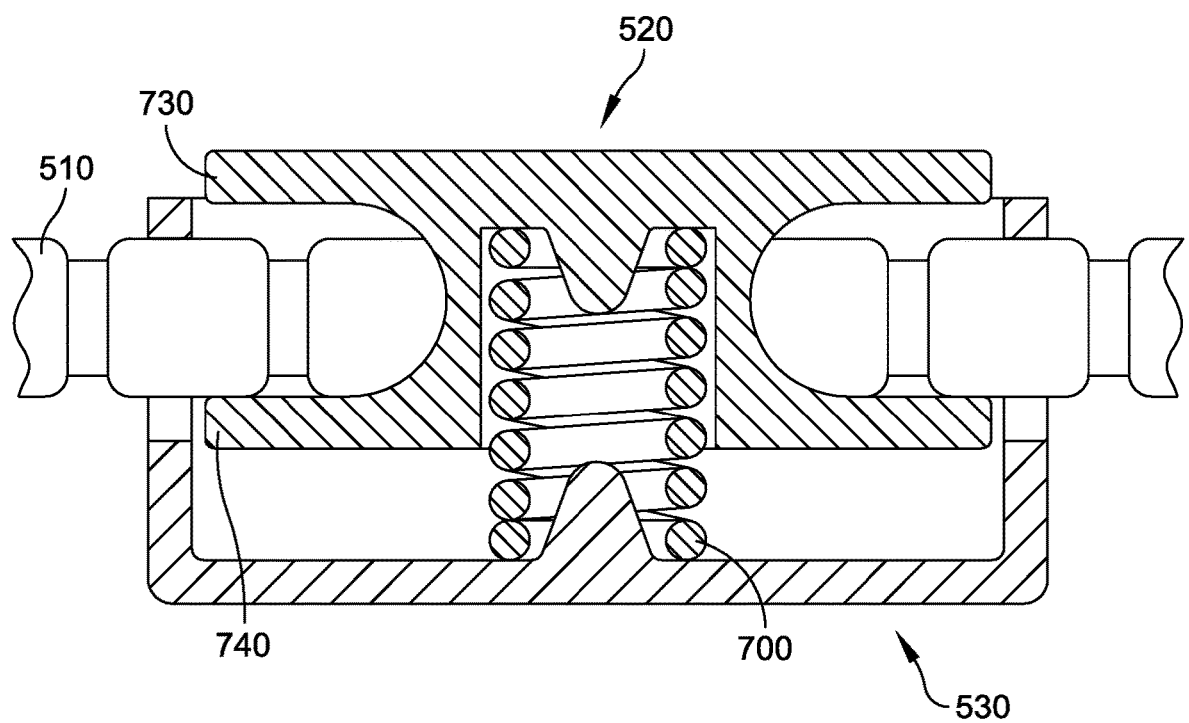
FIG. 19 is a cross-sectional view as taken along line 19-19 of FIG. 18.

FIG. 18 is a cross-sectional view as taken along line 18-18 of FIG. 17. As shown, the bias force applied on the inner member (e.g., arrows B1, B2 in FIG. 15) has been released, and the inner member thus moves outward by the force of the spring (arrow C1). This secures the elongated member 510 within the push button slide mechanism 500. As shown, the elongated member 510 passes through the holes in the sidewall of the outer member 530 yet are secured in place by the engagement of the annular channel against the sidewall by the spring bias (arrow C1) upward, as also shown in FIG. 19. As shown in FIG. 18, the elongated member 510 has a surface 1804 that engages with a surface 1804 on the bottom plate 740 of the inner member 520. This contact via surfaces 1804, 1802 locks the elongated member 510 within the mechanism 500 by the spring-bias of the spring applied on the inner mechanism 520 (via arrow C1).

FIG. 19 is a cross-sectional view as taken along line 19-19 of FIG. 18. As shown, the force of the spring 700 presses the bottom plate 740 of the inner member 520 upward, and causes the elongated member 510 to engage with an upward surface of the hole in the sidewall of the outer member 530, thereby locking the elongated member within the push button slide mechanism 500. As will be appreciated, pressing downward on the inner member 520 thereby releases the elongated member 510 so that it can be removed or otherwise adjusted with respect to the push button slide mechanism 500.

It will be appreciated that the use of an inner member that includes a single circumferential channel is a significant advance over the prior art. This greatly facilitates installation and use of the push button slide mechanism compared to prior art devices. It will be appreciated that the push button slide mechanism of the present disclosure may be of any dimension, size or configuration. Also, while the mechanism of the present invention is shown in a circular configuration, it may be of any configuration, such as an oval, square, or the like. It will be appreciated by those skilled in the art that various changes and modifications can be made to the illustrated embodiments without departing from the spirit of the present invention. All such modifications and changes are intended to be covered by the appended claims.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A push button slide mechanism, comprising:
an outer member having a bottom wall and an upstanding side wall; the outer member defining at least one pair of holes through the upstanding side wall;
wherein the at least one pair of holes are two pairs of oppositely disposed holes through the upstanding side wall of the outer member,
an inner member having a top plate and a bottom plate defining a single annular channel therebetween, said single annular channel comprising a circumferential channel that is completely open about the periphery of the inner member;
wherein both the top plate and the bottom plate are circular in shape;
wherein both the top plate and bottom plate have substantially the same diameter;
wherein the top plate and the bottom plate have respective continuous planar surfaces that define respective top and bottom surfaces of the circumferential channel;
a spring member, the spring member spring-biasing the outer member relative to the inner member;
whereby pressing the inner member toward the outer member against the spring forces of the spring causes the single annular channel to align with the holes through the upstanding side wall of the outer member thereby permitting an elongated member to pass through the at least one pair of the holes in the outer member and through the single annular channel of the inner member;
wherein the single annular channel receives the elongated member in all rotational positions of the inner member relative to the outer member;
whereby release of the inner member relative to the outer member provides a spring clamping force of the push button slide mechanism to the elongated member.

2. The push button slide mechanism of claim 1 wherein the upstanding side wall of the outer member defines a circular opening that is dimensioned to receive therein both the top plate and the bottom plate of the inner member.

3. The push button slide mechanism of claim 2 wherein the circular opening defined by the upstanding side wall of the outer member is dimensioned to be slightly greater than the diameter of either of the top plate and the bottom plate so that the top and bottom plates are guided within the circular opening.

4. The push button slide mechanism of claim 3 wherein a depth of the circular opening is greater than a total height of the inner member.

5. The push button slide mechanism of claim 1, wherein the elongated member comprises a chain or a cord.

6. The push button slide mechanism of claim 1, wherein the elongated member is configured to pass through a first hole of the at least one pair of holes on the outer member, in through the single annular channel, around a middle column of the inner member, and then out through a second hole of the at least one pair of holes on the outer member.

7. The push button slide mechanism of claim 1, wherein the elongated member has a first part configured to pass through a first hole on the outer member in through the single annular channel and out through a second hole on the outer member, and wherein a second part of the elongated member is configured to pass through a third hole on the outer member then in through the single annular channel and then out through a fourth hole on the outer member.

8. The push button slide mechanism of claim 1, wherein the spring is held in place by a centering post on the inner member and a corresponding spring centering post on the outer member, and wherein the spring centering post is within a cavity at a center of the single annular channel.

9. The push button slide mechanism of claim 1, wherein the spring is held in place by a spring centering post formed on the bottom plate of the inner member.

10. The push button slide mechanism of claim 1, wherein the bottom plate and the top plate are substantially parallel with respect to each other, and wherein the top plate and bottom plate planar surfaces are each entirely planar without any protuberances therefrom.

11. The push button slide mechanism of claim 1, wherein the holes are circular, square, or oval.

\* \* \* \* \*